3,026,229
METHOD OF LAMINATING LAYERS OF DIFFERENT POLYMERS
Forrest S. Wilcox, Newburgh, N.Y., assignor to E. I. du Pont de Nemours and Company, Wilmington, Del., a corporation of Delaware
No Drawing. Filed Nov. 14, 1958, Ser. No. 773,816
8 Claims. (Cl. 156—309)

This invention relates to a novel method of laminating an impervious layer comprising a synthetic polymer to another layer comprising a chemically dissimilar synthetic polymer, both of the polymers being at least initially thermoplastic.

There is a long-standing need in the laminating art for an improved method of bonding together two or more layers comprising chemically dissimilar synthetic polymers which have little or no natural bonding affinity for each other. Such unlike polymers do not weld or fuse together when subjected to the heat and pressure.

For example, a sheet of polyvinyl chloride containing composition will readily hot-press laminate to a sheet of the same material, or to a sheet of a chemically similar material such as a copolymer made from a major proportion of vinyl chloride and a minor proportion of a copolymerizable monomer, e.g., vinyl acetate; but it will not satisfactorily hot-press laminate to a sheet of chemically different polymer, such as polystyrene or polyethylene.

Attempts to laminate sheets of chemically dissimilar polymers by means of an intervening adhesive layer have not been entirely successful, particularly with such adhesive-repellent polymers at polytetrafluoroethylene, polyethylene and nylon. A drawback to the use of adhesives is the danger of introducing materials into the interlayer which, because of their inferior electrical, physical or chemical properties, render the composite product useless for the intended application.

This invention has as its primary object, therefore, the provision of a new and improved method of laminating an impervious layer comprising a synthetic polymer to another layer comprising a chemically dissimilar synthetic polymer. The invention will find its greatest utility in laminating two polymers which have little or no natural bonding affinity for each other, i.e., they will not firmly bond to each other when subjected to heat and pressure sufficient to fuse or melt the polymers. For the purpose of definition in describing this invention, when films of two different polymers are laminated by pressing them together at their softening temperature and they can be separated by a pull of less than 1.0 pound per inch of width of the laminate, after cooling to room temperature, they are considered to have no natural bonding affinity for each other.

Another object is the production of an integral composite sheet or laminate which contains only chemically dissimilar synthetic polymers which have no natural bonding affinity for each other.

Other important objects will be readily apparent from the following description of the invention.

Impervious layers or sheets comprising the chemically dissimilar synthetic polymers are laminated in accordance with this invention by sandwiching a composite waterleaf comprising a blend of fibrils or layers of fibrils of said polymers between the sheets prior to hot pressing, whereby each sheet is contiguous with at least some fibrils of the corresponding polymer. The fibrils of each polymer are preferably prepared by forming a solution of the polymer and then adding the solution to a liquid non-solvent for the polymer while being vigorously agitated. Water is the usual non-solvent in which the fibrils are formed. The fibrils dispersed in water, separately or in admixture, are filtered to form a composite waterleaf in which one surface comprises at least some fibrils of one polymer and the other surface comprises at least some fibrils of the other polymer. After being dried, the composite waterleaf is sandwiched between the impervious sheets so that at least some of the fibrils of each polymer the available at the interface between the waterleaf and the sheet comprising the corresponding polymer. Finally, the sandwiched assembly is subjected to sufficient heat and pressure to consolidate or fuse the waterleaf and bond the layers together thereby forming an integral composite sheet or laminate.

During the hot pressing operation, the fibrils substantially lose their identity as fibrils and the entire assembly becomes consolidated or fused into a compact and inseparably bonded polymeric mass.

Another form of the invention involves laminating a preformed film comprising a polymer which is at least initially thermoplastic to one side of a composite layered waterleaf which side comprises essentially fibrils of the same polymeric composition. The other side of the composite waterleaf, which forms one of the outer layers of the ultimate laminate, consists essentially of fibrils of a chemically dissimilar thermoplastic polymer. The laminating step is carried out by heating and pressing the superposed layers in which the fibrils are fused and lose their identity as fibrils. The resultant laminate consists of an integrally bonded structure with one side comprising a synthetic polymer and the other side comprising a chemically dissimilar polymer.

The term "fibrils" as used herein is intended to designate a mass of particles having at least one dimension of minor magnitude relative to its largest dimension; said particles being non-rigid and small enough to pass through a 10-mesh screen, yet large enough so that about 90% is retained by a 200-mesh screen when deposited from an agitated dilute aqueous suspension, and a capacity to form a waterleaf.

Certain polymeric fibrils useful in this invention may be prepared as described more fully in copending U.S. application S.N. 635,876, filed January 23, 1957, by P. W. Morgan, now abandoned.

The following specific examples are given with the intention of illustrating the invention and not limiting it in any way. Throughout the specification and claims, all parts and percentage figures shown are on a weight basis unless otherwise indicated.

*Example 1*

A film of polytetrafluoroethylene is laminated to a film of epoxy resin in the following manner:

A quantity of polytetrafluoroethylene fibrils is prepared by extruding 0.125 inch diameter beading from a paste containing naphtha-lubricated colloidal particles of polytetrafluoroethylene, cutting the beading into pieces about 0.5 inch long after the naphtha is removed, and shredding the pieces while in a water-wet condition into fibrils by passing them twice through a micropulverizer type of hammer mill. This method of making polytetrafluoroethylene fibrils is in accordance with the teaching of copending application S.N. 426,041, filed April 27, 1954, by E. F. Harford, now abandoned, and is described more fully therein.

By means of a high speed mixer, 6 parts of the resulting wet fibrils (48% water) are dispersed in 100 parts of water to which has been added 0.5 part of sodium carboxymethylcellulose as a thickener, 1 part of a nonionic wetting agent such as, e.g., octyl phenyl polyglycol ether ("Triton" X-100), and 1 part of ethyl acetate as a foam depressant. The resulting polytetrafluoroethylene fibril dispersion is strained through a filter plate provided with 25 mil slots, then diluted with water to a 0.3% fibril concentration. The diluted dispersion is vacuum filtered through a bed composed of an upper layer of a woven continuous filament nylon fabric weighing one ounce per square yard and having a thread count of 100 x 100, an intermediate layer of a 0.1 inch thick wool felt and a 100 mesh screen.

The wet cake of filtered polytetrafluoroethylene fibrils is washed with water, vacuum drained, removed from the filtration apparatus, and set aside for subsequent use in making a composite waterleaf.

A quantity of epoxy resin fibrils is prepared by first dissolving 200 parts of the resin in 800 parts of tetrahydrofurane. The epoxy resin (Shell "Epon" 1009) is a bis phenol/epichlorohydrin reaction product having an epoxide equivalent of 2400–4000, a melting point of 145 to 155° C., and a Gardner-Holdt viscosity of $Z_2$ to $Z_5$ when tested as a 40% solution in butyl carbitol. To 350 parts of the tetrahydrofurane solution of resin is added 150 parts of a catalyst solution made by mixing 100 parts of tetrahydrofurane with 50 parts of a 60% butanol solution of a butanol-modified urea-formaldehyde resin. Reference is made to U.S. Patent 2,191,957 for a more detailed description of epoxy resin and its method of preparation.

Next, 10 parts of the resulting epoxy resin/catalyst solution are poured as a fine stream into 500 parts of water at 70° F. while the latter is vigorously agitated. The water contains 0.05% of octyl phenyl polyglycol ether ("Triton" X-100). As the solution enters the turbulent water, the resin/catalyst solids are rapidly precipitated in the form of fibrils.

A wet cake of the catalyst-containing epoxy resin fibrils is prepared by depositing the fibrils on a 100 mesh filter screen, washing them with water, vacuum draining, and removing the resulting fibril cake from the screen.

The following three composite waterleaves are made from the above-prepared wet cakes of polytetrafluoroethylene fibrils and epoxy resin fibrils blended to give the ratios indicated below:

| Waterleaf | Fibril Content (Dry Weight Ratio) |
| --- | --- |
| No. 1 | 3 Parts Polytetrafluoroethylene/1 Part Epoxy Resin. |
| No. 2 | 1 Part Polytetrafluoroethylene/1 Part Epoxy Resin. |
| No. 3 | 1 Part Polytetrafluoroethylene/3 Parts Epoxy Resin. |

Each of these waterleaves is prepared by dispersing a total of about 15 parts of blended fibrils, in the ratios shown, in 3000 parts of water containing 0.05% of octyl phenyl polyglycol ether, vacuum filtering the mixed fibril dispersion in a papermakers' hand sheet box equipped with a 100 mesh screen, rinsing, removing the vacuum-drained waterleaf from the screen, and drying it on a paper drier. Each dried waterleaf weighs about 10.7 ounces per square yard.

The following layers are placed in a heated flat-platen press, one atop the other, in the order listed: a 10 mil thick film of polytetrafluoroethylene, Waterleaf No. 1, Waterleaf No. 2, Waterleaf No. 3, and a 4 mil thick film of an epoxy resin made by casting on a glass plate the same solution as was used above for making the epoxy resin fibrils and drying. The stacked layers are preheated briefly under little or no pressure; then they are consolidated and laminated into a composite sheet by employing a platen temperature of 650° F. and a pressure of 8000 pounds per square inch for a period of 20 seconds. Cooling of the laminate is done under pressure to insure against warpage.

A force of 6 pounds per inch width is required to separate the polytetrafluoroethylene layer from the laminate when inter-ply adhesion is tested by the familiar one inch strip method.

A control sample prepared by repeating the laminating procedure described in this example except for omission of the waterleaves has a bond strength of only 0.1 pound per inch width between the two dissimilar outer plies.

The composite waterleaf-bonded laminate of this example is useful for providing a polytetrafluoroethylene surface on articles such as metal rollers or drums, since it is relatively easy to bond the epoxy resin side of the laminate to metallic surfaces with commercial epoxy resin adhesives made for this purpose. Heretofore, it has been difficult to bond polytetrafluoroethylene sheet materials to metal articles, particularly when a heat resistant bond is required.

*Example 2*

This example illustrates the lamination of a film of polyethylene to a film of chlorosulfonated polyethylene.

A quantity of polyethylene fibrils is prepared by making a 10% solution of polyethylene in boiling xylene, and pouring one part of the hot solution as a fine stream into 15 parts of vigorously agitated cold (70° F.) xylene. The polyethylene fibrils thus formed are separated from the xylene on a 100 mesh screen, where they are washed with water and drained.

Separately, a quantity of chlorosulfonated polyethylene fibrils is prepared by first forming a 20% solution of a conventionally compounded and milled chlorosulfonated polyethylene composition in tetrahydrofurane. Then 200 parts of the 20% solution are slowly added as a fine stream to a vigorously agitated precipitant consisting of 2000 parts of water at about 40° F. and 3.2 parts of "Philblack" carbon black pigment. The resulting pigmented chlorosulfonated polyethylene fibrils are deposited on a screen, washed with water and drained.

The following two composite waterleaves are made from the two types of fibrils prepared above:

| Waterleaf | Fibril Content (Dry Weight Ratio) |
| --- | --- |
| No. 4 | 1 Part Polyethylene/4 Parts Chlorosulfonated Polyethylene. |
| No. 5 | 3 Parts Polyethylene/2 Parts Chlorosulfonated Polyethylene. |

These two waterleaves are prepared in the same manner as those of Example 1, except a total of only 10 parts of fibrils are used in the mixed dispersion, and each dried waterleaf weighs only about 7.1 ounces per square yard.

The following layers are stacked in a heated laminating press in the order listed below: a 20 mil film of uncured chlorosulfonated polyethylene made from the same composition used in making the chlorosulfonated polyethylene fibrils, Waterleaf No. 4, Waterleaf No. 5, and a 10 mil film of polyethylene. The stacked layers are preheated briefly under little or no pressure. Then they are consolidated and laminated into a composite sheet by subjecting the assembly to a platen temperature of 300° F., and a pressure of 150 pounds per square inch for a period of 3 minutes. As a final step, the laminate is placed in a 290° F. oven for 4 hours to cure the chlorosulfonated polyethylene component.

The cooled product has an inter-ply bond strength of 4.5 pounds per inch, i.e., a force of 4.5 pounds per inch width is required to separate the chlorosulfonated polyethylene portion from the polyethylene portion.

The chlorosulfonated polyethylene used in this Example 2 is similar to that described in more detail in U.S. Patent 2,586,363.

A control sample made by repeating the laminating procedure of this example except for omission of the waterleaves has an inter-ply bond strength of only 0.2 pound per inch width.

Since the product of this example combines the desirable properties of polyethylene and chlorosulfonated polyethylene in the form of a composite sheet, many uses will be apparent to those engaged in the art of plastic laminates. For example, the product is well adapted for use in various critical paulin and protective covering applications.

Example 3

This example illustrates the manufacture of a composite sheet in which one outer layer is neoprene and the other outer layer is butyl rubber.

A quantity of neoprene fibrils is prepared by first forming a 32% solution of the following milled neoprene composition dispersed in tetrahydrofurane:

| | Parts by weight |
|---|---|
| Neoprene GN | 48.39 |
| Neoprene W | 51.61 |
| Carbon black pigment | 77.97 |
| Neozone D (phenyl beta naphthylamine) | 1.94 |
| Stearic acid | 1.94 |
| Calcium carbonate | 41.29 |
| Magnesium oxide | 4.52 |
| Neophax A (sulfurized oil) | 6.45 |
| Circo oil (mixture of pure petroleum oil) | 7.10 |
| Zinc oxide | 6.96 |
| Peptizer RR-10 (mixed di-xylol disulfides) | .48 |
| Accelerator NA-22 (active ingredient 2-mercaptoimidazoline) | .30 |
| | 248.95 |

Then 200 parts of the 32% neoprene solution are slowly added as a fine stream to an agitated precipitant consisting of 2000 parts of water at about 40° F., and 7 parts of fine asbestos. The resulting neoprene fibrils are deposited on a screen, washed with water and drained.

Separately, a quantity of butyl rubber fibrils is prepared by first forming a 10% solution of the following milled butyl rubber calender composition dispersed in tetrahydrofurane:

| | Parts by weight |
|---|---|
| Butyl rubber (copolymer of about 98 parts of isobutylene and 2 parts of isoprene) | 100.0 |
| Polyac (25% polyparadinitrosobenzene and 75% inert material) | 0.5 |
| Stearic acid | 0.5 |
| Carbon black pigment | 50.0 |
| Clay | 100.0 |
| Zinc oxide | 5.0 |
| Circo oil (mixture of pure petroleum hydrocarbon) | 15.0 |
| Tetramethyl thiuram disulfide | 1.0 |
| Benzothiazyl disulfide | 1.0 |
| Sulfur | 2.0 |
| | 275.0 |

Two hundred parts of the above 10% solution are slowly added as a fine stream to a vigorously agitated precipitant consisting of 1250 parts of water at about 40° F., and 7 parts of fine asbestos. The resulting butyl rubber fibrils are deposited on a screen, washed with water and drained.

To 1000 parts of water is added 5 parts of octyl phenyl polyglycol ether and 3 parts (dry weight basis) of the above-prepared neoprene fibrils. This mixture is agitated for 5 minutes, thereby converting the water to a foam. Water is introduced to a depth of 2 inches into a papermaker's hand sheet box equipped with a 100 mesh screen covered with nylon parachute fabric. The foam-dispersed neoprene fibrils prepared as described above are then poured into the water-containing sheet box, and vacuum is applied immediately to deposit the fibrils on the nylon-covered screen to form Waterleaf No. 6. The process of dispersing fibers in a foam and the resulting waterleaves made therefrom is disclosed and claimed by F. Wilcox in copending application S.N. 726,186, filed April 3, 1958. On a dry weight basis, the neoprene fibril waterleaf weighs about 2.1 ounces per square yard.

While still on the screen, the neoprene fibril Waterleaf No. 6 is covered with a sheet of rubber. Then a second fibril/foam dispersion is prepared in the same manner as the first except that a blend of neoprene and butyl rubber fibrils are used, in the ratio shown below for Waterleaf No. 7. This dispersion is poured into the papermaker's box, after which the sheet of rubber is removed without disturbing the first waterleaf. Vacuum is again applied to deposit the second waterleaf directly upon the first. While the two layered structure is still mounted on the screen, three more waterleaves are prepared directly thereon using the type and proportion of fibrils indicated for Waterleaf layers Nos. 8, 9 and 10 in the following table:

| Waterleaf Layer | Fibril Content (Dry Weight Ratio) |
|---|---|
| No. 6 | Neoprene—100%. |
| No. 7 | 3 Parts Neoprene/1 Part Butyl Rubber. |
| No. 8 | 1 Part Neoprene/1 Part Butyl Rubber. |
| No. 9 | 1 Part Neoprene/3 Parts Butyl Rubber. |
| No. 10 | Butyl Rubber—100%. |

Waterleaf layers Nos. 6, 7, 8 and 9 each weigh about 2.1 ounces per square yard and Waterleaf layer No. 10 weighs about 4.2 ounces per square yard.

The resulting five-layered composite stratified fibril waterleaf is oven dried, removed from the nylon fabric, and placed on a 50 mil thick sheet of uncured neoprene, with Waterleaf layer No. 6 facing the neoprene sheet, and Waterleaf layer No. 10 on top of the assembly. This assembly of layers is placed in a heated laminating press between two release sheets of polytetrafluoroethylene coated glass fabric where it is preheated briefly under little or no pressure. The layers are finally consolidated, laminated and cured into a composite sheet by subjecting the assembly to a platen temperature of 320° F. and a pressure of 200 pounds per square inch for a period of 10 minutes. Waterleaf No. 10 is converted in situ of a film-like outer layer of butyl rubber layer.

The cooled product has an inter-ply bond strength of 10 pounds per inch width, that is, a force of 10 pounds per inch of width is required to separate the butyl rubber surface layer (formed from Waterleaf No. 10) from the balance of the structure.

A control sample made by repeating the procedure of this example except for omission of all the waterleaves but No. 10 has an inter-ply bond strength of only 3 pounds per inch width.

Because of the imperviousness of the butyl rubber surface layer to corrosive chemicals, and because the neoprene side can be readily adhered to metallic surfaces by established methods, the product of this example is useful as a lining material for chemical processing and storage tanks.

Example 4

A quantity of chlorosulfonated polyethylene synthetic rubber fibrils is prepared in the same manner as in Example 2, followed by screening and washing.

Next, a quantity of Buna N copolymer of butadiene and acrylonitrile synthetic rubber fibrils is prepared from a 10% solution in tetrahydrofurane of the following compounded and milled composition:

| | Parts by weight |
|---|---|
| Copolymer butadiene and acrylonitrile (Buna N) | 52.7 |
| Calcium carbonate | 10.5 |
| Stearic acid | .5 |
| Zinc oxide | 2.7 |
| Phenyl-beta-naphthylamine | .5 |
| Dibutoxy ethyl sebacate | 21.0 |
| Sulfur | .8 |
| Carbon black ("Pelletex" C) | 21.0 |
| Benzothiazyl disulfide | .8 |
| | 110.5 |

Two hundred parts of the 10G solution are slowly added as a fine stream to an agitated precipitant consisting of 1550 parts of water at about 40° F., and 3.2 parts of carbon black ("Philblack" A). The resulting fibrils are screened, water washed and drained.

A five-layered composite waterleaf is prepared in the same manner as in Example 3, except the waterleaves are prepared from blends of chlorosulfonated polyethylene and Buna N fibrils in ratios indicated in the following table:

| Waterleaf Layer | Fibril Content (Dry Weight Ratio) |
| --- | --- |
| No. 11 | All Chlorosulfonated Polyethylene—100%. |
| No. 12 | 3 Parts Chlorosulfonated Polyethylene/1 Part Buna N. |
| No. 13 | 1 Part Chlorosulfonated Polyethylene/1 Part Buna N. |
| No. 14 | 1 Part Chlorosulfonated Polyethylene/3 Parts Buna N. |
| No. 15 | Buna N Composition—100%. |

Each layer weighs about 2.1 ounces per square yard on a dry weight basis.

Following drying of the composite waterleaf, it is removed from the nylon fabric on which it was formed, and placed between a 20 mil thick outer sheet of uncured chlorosulfonated polyethylene and a 20 mil thick outer sheet of uncured Buna N. The sheets of chlorosulfonated polyethylene and Buna N were formed on a calender from the same compositions from which the fibrils were formed. Waterleaf layer No. 11 faces the chlorosulfonated polyethylene sheet and Waterleaf layer No. 15 faces the Buna N sheet.

This assembly of layers is laminated and cured into a composite sheet by the same method as described in Example 3. The cooled product has an inter-ply bond strength of 5 pounds per inch width.

*Example 5*

A polyvinyl chloride/polymethylstyrene laminate is made as follows:

Polyvinyl chloride ("Geon" 101) fibrils are prepared from a 5% solution of the polymer in methyl ethyl ketone in a manner similar to that described in Example 1 by gradually pouring 20 parts of the solution into 80 parts of water at about 60° F. while the water is vigorously agitated. The screening, rinsing and draining of the resulting fibrils follows.

In a like manner, polymethylstyrene ("Cymac" 400) fibrils are prepared from a 10% solution of the polymer in tetrahydrofurane by gradually pouring 100 parts of the solution into 400 parts of a 0.5% aqueous solution of carboxymethyl cellulose while the latter is agitated, followed by screening, rinsing and draining.

A four-layered composite waterleaf is prepared from the two types of fibrils described above, employing the method of Example 3. The layers are as follows:

| Waterleaf Layer | Fibril Content (Dry Weight Ratio) |
| --- | --- |
| No. 16 | 4 Parts Polyvinyl Chloride/1 Part Polymethylstyrene. |
| No. 17 | 3 Parts Polyvinyl Chloride/2 Parts Polymethylstyrene. |
| No. 18 | 2 Parts Polyvinyl Chloride/3 Parts Polymethylstyrene. |
| No. 19 | 1 Part Polyvinyl Chloride/4 Parts Polymethylstyrene. |

Each layer weighs about 3.8 ounces per square yard when dry and are superposed in the order listed.

The composite waterleaf is dried and then sandwiched between a solid 50 mil thick sheet of rigid polyvinyl chloride and a solid 50 mil thick sheet of polymethylstyrene so that Waterleaf layer No. 16 faces the polyvinyl chloride sheet and Waterleaf layer No. 19 faces the polymethyl styrene sheet. The resulting assembly is laminated into a composite sheet by a pressing method similar to that used in Example 3, except the platen temperature is 380° F., the pressure is about 210 p.s.i. and the laminating time is one minute. The separate layers are firmly bonded together. Improved chemical ducts can be fabricated from the laminated product, in which the polyvinyl chloride contributes resistance to solvents and chemicals and the polymethyl styrene contributes resistance to deformation by heat.

*Example 6*

A laminate similar to the one produced in Example 5 is made by repeating that example except that a single layered waterleaf containing 75 parts of the polyvinyl chloride fibrils and 25 parts of the polymethylstyrene fibrils, and having a dry weight of 7.6 ounces per square yard is employed as the bonding layer between the polyvinyl chloride and polymethylstyrene outer layers.

*Example 7*

A polyethylene/neoprene laminate is made by first preparing polyethylene fibrils as described in Example 2 and neoprene fibrils as described in Example 3. Next, a four-layered composite waterleaf is prepared from the resulting two types of fibrils by the method of Example 3. The dry weight ratios of polyethylene/neoprene in the four superposed layers are the same as those shown for the composite waterleaf of Examples 5, that is, 4:1, 3:2, 2:3 and 1:4 respectively. Each of the four waterleaf layers weigh about 7.6 ounces per square yard when dry.

When dry, the composite waterleaf is sandwiched between a solid 50 mil thick sheet of polyethylene and a solid 50 mil thick uncured sheet formed from the neoprene composition from which the neoprene fibrils of Example 3 were formed so that the waterleaf layer containing only polyethylene fibrils faces the former and the waterleaf containing only polyethylene fibrils faces the latter. The sandwiched assembly is laminated by the method used in Example 3 except the platen temperature is 300° F., the pressure is 250 p.s.i., and the time cycle is one minute. The laminate is finally transferred to an oven for a curing cycle of 4 hours at 290° F. After cooling, the laminate has an interply bond strength of 3 pounds per inch width.

A control sample made by repeating the above laminating procedure except for omission of the composite waterleaf has an inter-ply bond strength of only 0.2 pound per inch width.

*Example 8*

A polyethylene/nylon laminate is made by first preparing polyethylene fibrils as described in Example 2 and preparing nylon fibrils from a 10% solution of nylon (polyhexamethylene adipamide) in 90% formic acid by gradually pouring 10 parts of the solution into 100 parts of a 50/50 mixture of glycerol and water at 60° F. while the latter is vigorously agitated. Screening, rinsing and vacuum draining completes the preparation of the nylon fibrils. A four-layered composite waterleaf is prepared from these two types of fibrils by the method of Example 3, with the dry weight ratios of the respective layers the same as those shown in Example 5; that is, the polyethylene/nylon ratios in the four layers are 4:1, 3:2, 2:3 and 1:4. The separate layers are superposed in the order listed. Each layer has a dry weight of about 7.2 ounces per square yard.

The dried composite waterleaf is sandwiched between a solid 50 mil thick sheet of polyethylene and a solid 50 mil thick sheet of nylon (polyhexamethylene adipamide) so that the waterleaf layer containing the greatest proportion of polyethylene fibrils faces the polyethylene sheet and the waterleaf layer containing the greatest proportion of nylon fibrils faces the nylon sheet. The sandwiched assembly is placed in a hot laminating press and bonded into an integral sheet using a platen temperature of 380° F., a pressure of 100 p.s.i., and a dwell time of one minute. When cooled, the laminate has an inter-ply bond strength of 11.4 pounds per inch width.

A control sample made by repeating the above laminating procedure except for omission of the composite waterleaf has an inter-ply bond strength of only 0.1 pound per inch width.

*Example 9*

Solid sheets of polyethylene and plasticized polyvinyl chloride are laminated to each other as follows:

Polyethylene fibrils are prepared as described in Example 2 and plasticized polyvinyl chloride fibrils are prepared as described in Example 1 of copending application S.N. 732,365, filed May 1, 1958, by H. P. Wood.

A three-layered composite waterleaf is prepared from blends of these two types of fibrils by the method of Example 3 in which the dry-weight ratios of the polyethylene and polyvinyl chloride fibrils in the separate layers are 4:1, 1:5 and 1:9 respectively. Each layer has a dry weight of about 10.7 ounces per square yard.

The dried composite stratified waterleaf is sandwiched between a solid 15 mil thick sheet of polyethylene and a solid 15 mil thick sheet comprising about 35 parts polyvinyl chloride, 18 parts castor oil maleate and 47 parts titanium dioxide so that the 4:1 layer faces the former and the 1:9 layer faces the latter. The sandwiched assembly is laminated at a platen temperature of 360° F., a pressure of 100 p.s.i., and a dwell time of 10 seconds. When cooled, the laminate has an inter-ply bond strength of 4 lbs. per inch width. It is useful as a book cover material.

A control sample made by repeating the above laminating procedure except for omission of the composite waterleaf has inter-ply bond strength of only 0.1 pound per inch width.

*Example 10*

A film of polyethylene is laminated to a film of a polyester resin in the following manner:

Polyethylene fibrils are prepared as described in Example 2 and copolyester fibrils are prepared from an 80:20 ethylene terephthalate/ethylene isophthalate copolymer by gradually pouring 30 parts of a 10% solution of this copolyester in trifluoroacetic acid into an agitated mixture of 350 parts of glycerol and 50 parts of water, followed by screening, rinsing and draining the resulting fibrils.

A four-layered composite waterleaf is prepared from these two types of fibrils by the method of Example 3, the dry-weight ratios of polyethylene and copolyester fibrils in the layers being 4:1, 3:2, 2:3 and 1:4 respectively. Each layer has a dry weight of about 7.2 ounces per square yard.

The resulting composite waterleaf, when dried, is sandwiched between a solid 50 mil thick film of polyethylene and a solid 25 mil thick film of the same copolyester resin from which the above copolyester fibrils are made.

In the sandwiched assembly, the side of the waterleaf richer in polyethylene fibrils faces the polyethylene film and the side richer in copolyester fibrils faces the copolyester film. The assembly is laminated at a platen temperature of 360° F., a pressure of 100 p.s.i. and a dwell time of one minute. When cooled, the laminate has an inter-ply bond strength of 6.2 pounds per inch width.

A control sample made by repeating the above laminating procedure except for omission of the composite waterleaf has an inter-ply bond strength of only 0.1 pound per inch width.

*Example 11*

A rigid plastic construction material useful for making ducts to transport corrosive gases and containers for corrosive liquids is made as follows:

The single layered waterleaf weighing about 11.0 ounces per square yard employed in this example is made from a blend of an aqueous dispersion of polyvinyl chloride fibrils, polymethylstyrene fibrils and rayon staple fibers. The aqueous dispersion of fibrils and fibers from which the waterleaf is made has the following formula:

| | Parts by weight |
|---|---|
| Aqueous dispersion of polyvinyl chloride fibrils prepared as described in Example 5 containing 0.5% fibrils and .02% octyl phenyl polyglycol ether | 150.0 |
| Aqueous dispersion of polymethylstyrene fibrils prepared as described in Example 5 containing 0.5% fibrils and .02% octyl phenyl polyglycol ether | 50.0 |
| Aqueous dispersion of viscose rayon (Super Cordura) staple fibers ½ inch long and 2.5 denier containing 0.5% fibers and .02% octyl phenyl polyglycol ether | 20.0 |
| | 220.0 |

The above composition was run on a paper making screen and a waterleaf was formed in the well known manner.

A sheet of 15 mils thick rigid pigmented polyvinyl chloride is laminated to a 110 mils thick sheet of polymethylstyrene by sandwiching the above described waterleaf between the two sheets and subjecting the sandwich to a pressure of about 1000 pounds per square inch and a temperature of about 350° F. for a period of about 3 minutes.

Other fibers such as, e.g., cotton, nylon, polyacrylonitrile or polyethylene terephthalate may be used in place of rayon fibers in the above described waterleaf. The ratio of fibers to fibrils may vary over a wide range; however, it is preferred that the fibrils represent the majority of the dry waterleaf.

Each sheet to be laminated can consist entirely of a synthetic polymer, or it can consist of a composition in which said polymer is the major binder or film forming ingredient. For certain end uses, such as electrical insulation, it is desirable that the final product contain no material other than the polymers from which the fibrils and the two outer layers are formed.

While polymers, as defined hereinabove, are especially useful for making the composite waterleaf, other synthetic polymers can also be used, the only essential requirement being that the polymers have the capacity to fibrillate and form fibrils from which a waterleaf can be prepared.

The composition of the composite waterleaf is only critical to the extent that both surfaces thereof must contain a substantial proportion, preferably at least 50% surface area, of fibrils of the polymer corresponding to the polymer of the sheet to be contiguous therewith. In addition to the blend of different fibrils, the waterleaf can contain a minor proportion of staple fibers and other additives; however, caution should be taken that additives are not incorporated which will be detrimental to the desired properties of the laminated product.

Best results are usually obtained when the waterleaf is a heterogeneous or stratified structure containing substantially equal amounts of the two different types of fibrils in the central layer and containing gradually increasing amounts of one fibril towards one side and of the other fibril towards the other side with each outer surface containing about 70 to 100% of the essential fibril. The waterleaf should ordinarily be substantially dry before the hot-pressing step.

The sheets to be laminated by the method of this invention, and the corresponding fibrils, can be made of any normally solid synthetic polymer which, at least initially, is thermoplastic; that is, capable of flowing and welding to itself when subjected to heat and pressure. Such polymers are exemplified by the following: acrylonitrile polymers and copolymers, polyacrylic and polymethacrylic esters, polyvinyl chloride and copolymers of vinyl chloride with vinyl esters and other copolymerizable monomers, vinylidene chloride polymers, polyhydrocarbons, such as polyethylene and polystyrene, chlorosulfonated polyethylene, fluorinated polymers, such as polytetrafluoroethylene and polychlorotrifluoroethylene, polyamides and copolyamides, polyurethanes, polyureas, polyesters, epoxide polymers, such as glycidyl polyethers made by reacting polyhydric phenols with epihalohydrins, and uncured elastomers which can be cured during or after the laminating step, such as, e.g., neoprene, butyl rubber, and copolymers of butadiene and acrylonitrile.

It is not necessary that the sheets to be laminated and the fibrils of the waterleaf consist entirely of the polymer selected, but the polymer must at least be the principal binder or film-forming ingredient therein.

From the foregoing description, it will be seen that the present invention brings about a valuable advance in the laminating art, enabling sheets of different polymers which normally are difficult to bond together to be laminated in a simple hot-pressing operation. It further enables such lamination to be accomplished without introducing substances into the bonding layer which are harmful to the ultimate properties desired in the laminated product.

This novel laminating method has unique utility for producing laminates for the chemical and electrical industries, where it is often desirable to combine the desirable properties of two or more different polymers into a single composite structure. For example, one side of the laminate might be exposed in service to conditions which are best met by one polymer and the other side to completely different conditions which are best met by a different polymer. The invention finds specific usefulness in making electrical insulators, chemical ducts, paulins, tank lining material, roll covers, gasketing and diaphragms.

While there are above disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated therein, or required by the prior art.

The embodiments of the invention in which the exclusive property or privilege is claimed are defined as follows:

1. The method of laminating a preformed film comprising a synthetic polymer to a layer comprising a synthetic chemically dissimilar polymer which comprises assembling said film over a layered waterleaf, one side of said waterleaf comprising essentially fibrils of said first mentioned polymer and the other side of said waterleaf comprising essentially fibrils of said chemically dissimilar polymer, said polymers being at least initially thermoplastic and having no substantial natural bonding affinity for each other, said fibrils of said first mentioned polymer contacting said film, heating and pressing said assembly whereby said layers are fused into an integral structure.

2. The method of laminating a preformed film comprising a thermoplastic synthetic polymer to another preformed film comprising a chemically dissimilar synthetic polymer which comprises assembling between said films a waterleaf layer comprising fibrils of said polymers, at least some fibrils of the first mentioned polymer contacting the first mentioned film and at least some fibrils of the second mentioned polymer contacting the second mentioned film, said polymers having no substantial natural bonding affinity for each other, heating and pressing said assembly whereby said layers are fused into an integral structure.

3. The method of claim 2 in which said waterleaf comprises a minor proportion of fibers.

4. The method of claim 2 in which the waterleaf is a blend of said fibrils.

5. The method of claim 2 in which the waterleaf is a layered structure comprising essentially fibrils of the first mentioned polymer on one side and comprising essentially fibrils of the second mentioned polymer on the other side.

6. The process of claim 2 in which the respective polymers are thermoplastic resins.

7. The process of claim 2 in which the respective polymers are elastomers.

8. The process of claim 2 in which one of the polymers is a thermoplastic resin and the other is an elastomer.

References Cited in the file of this patent

UNITED STATES PATENTS

| | | |
|---|---|---|
| 1,998,827 | Worrell et al. | Apr. 23, 1935 |
| 2,476,283 | Castellan | July 19, 1949 |
| 2,697,058 | Lasak | Dec. 14, 1954 |
| 2,708,289 | Collings | May 17, 1955 |
| 2,728,698 | Rudner | Dec. 27, 1955 |
| 2,740,050 | Schultz | Mar. 27, 1956 |
| 2,765,247 | Graham | Oct. 2, 1956 |